United States Patent [19]
Matula

[11] 3,835,373
[45] Sept. 10, 1974

[54] ROTATIONAL POSITION SENSOR UTILIZING A HALL DEVICE AND MEANS TO MAINTAIN THE HALL VOLTAGE CONSTANT

[75] Inventor: Jerry Matula, Culver City, Calif.
[73] Assignee: Pertec Corporation, Los Angeles, Calif.
[22] Filed: Feb. 12, 1973
[21] Appl. No.: 331,342

[52] U.S. Cl. ............ 324/34 PS, 324/45, 338/32 H, 340/271, 340/282, 318/653
[51] Int. Cl. ............................................. G01r 33/00
[58] Field of Search .......... 324/34 PS, 34 D, 45, 46; 338/32 H, 32 R; 323/94 H; 340/271, 282; 318/647, 653, 676

[56] References Cited
UNITED STATES PATENTS
3,359,522  12/1967  Albrecht et al. ...................... 324/45
3,573,616   4/1971  Kahen ................................... 324/45

FOREIGN PATENTS OR APPLICATIONS
1,154,281   9/1963  Germany ............................. 324/45

OTHER PUBLICATIONS
Hall Effect in Solid; Radio Electronics; July 1968, pp. 42–45 and 93.

Primary Examiner—Robert J. Corcoran
Attorney, Agent, or Firm—Fraser and Bogucki

[57] ABSTRACT

A rotational position sensor is disclosed in which a Hall Effect device mounted within an air gap of variable size within a magnetic circuit is subjected to changes in magnetic flux density in direct relation to the rotational position of a cylindrical member forming a part of the magnetic circuit. The magnetic circuit includes a C-shaped permanent magnet having opposite pole pieces forming air gaps with the cylindrical member. The cylindrical member comprises a half cylinder in the region of the air gap containing the Hall Effect device so as to vary the effective area of the gap and thus the flux density as the cylindrical member turns. The voltage of the Hall Effect device is applied to a feedback circuit including a differential amplifier so as to vary the current through the device as necessary to maintain the Hall voltage constant and provide an output voltage which varies linearly with the rotational position of the cylindrical member.

14 Claims, 13 Drawing Figures

FIG.—13

ROTATIONAL POSITION SENSOR UTILIZING A HALL DEVICE AND MEANS TO MAINTAIN THE HALL VOLTAGE CONSTANT

BACKGROUND OF THE INVENTION

1. Field of the Invention

The present invention relates to rotational position sensors, and more particularly to sensors of the type which generate an electrical signal representing the angular position of a rotatable element.

2. Description of the Prior Art

Rotational position sensors have found use in a wide range of different applications. For example, in the case of magnetic tape decks it is not uncommon to provide a pair of arms adjacent supply and takeup reels on opposite sides of a tape driving mechanism such as a capstan for maintaining constant tape tension and providing tape storage. The supply and takeup reels are commonly driven by motors coupled to servo systems which are responsive among other things to the angular positions of the tension arms. In such situations it is desirable to be able to equip each of the tension arms with a rotational position sensor capable of producing an output which varies linearly with the angular position of the tension arm and which is at the same time of low cost and relatively maintenance free construction, has a minimum of moving parts, and has low inertia so as not to substantially interfere with the operation of the tension arms.

Rotational position sensors find similar application when used with the tension arms in certain cameras such as those of the microfilm type used in data processing operations. In such instances, it is desirable to drive the reel motors for the film in accordance with the behavior of the tension arms to prevent stretching of the film. Stretching exposes and ruins the film.

One approach to the problem of providing sensors of all types, rotational and otherwise, involves the use of a Hall Effect device. In the typical Hall Effect device a Hall element comprising a plurality of semiconductor materials of different conductivity types is subjected to a changing magnetic field so as to deflect charge carriers in the Hall Effect element produced by passing a current therethrough. The Hall Effect device measures the extent of charge carrier deflection and thus the flux density in terms of a variable voltage appearing between terminals at opposite ends of the Hall Effect element. Such voltage is generally proportional to the flux density through the Hall Effect element, and may therefore be used to measure or otherwise represent a number of different parameters which can be translated into a magnetic field.

One principal difficulty in the use of Hall Effect devices to measure varying parameters stems from the fact that the magnetic flux density varies hyperbolically in a proportional air gap producing non-linear relation between position and Hall element output voltage. While a nonlinear relationship may be tolerable for some applications, it is highly undesirable in such applications as for cameras and tape transports where the loop tension servo systems require a signal representing the angular position of each tension arm to a high degree of accuracy. A further problem in the use of Hall Effect devices as a part of measuring or sensing instruments lies in the conversion of the parameter to be measured into a varying magnetic field. Thus in the case of a rotational position sensor it is important that an arrangement be provided which is relatively inexpensive, simple in configuration, and relatively maintenance free, and yet which translates rotational changes into changes in flux density in such fashion that the output signal changes are at least proportional to the changes in angular position.

BRIEF SUMMARY OF THE INVENTION

In accordance with the invention a Hall Effect device is advantageously combined with a circuit which changes the current so as to maintain the Hall voltage of the Hall Effect device constant and which in the process produces an output voltage proportional to a linearly varying air gap through which a constant magnetic flux is maintained. In one preferred arrangement, the terminals for producing the Hall voltage across the semiconductor material of the Hall Effect element are coupled to the inputs of a differential amplifier having an output coupled in a feedback loop through a resistor and potentiometer to the control current input of the Hall Effect device together with a fixed current source for the device. The differential amplifier responds to the voltage by changing the current into the device to an extent necessary to maintain the voltage constant. The extent of current change is represented by a voltage at the output of the differential amplifier which comprises the output voltage for the circuit and which varies linearly with the linear change of the air gap under constant magnetic flux. The potentiometer in the feedback circuit varies the useful range of the circuit for a given range of flux densities through the Hall Effect device, while a potentiometer coupled to selected terminals of the operational amplifier comprising the differential amplifier provides for adjustment of the output voltage between zero and a maximum value for the flux density range at the Hall Effect device.

In accordance with the invention Hall Effect device circuits of the type described form a part of rotational position sensors which produce an output signal varying linearly with the angular position of a rotatable element. Such sensors include apparatus for producing a flux density proportional to the angular position of a rotatable element. In one preferred arrangement of such a sensor the Hall Effect device is mounted within an air gap of variable size formed between one of the pole pieces of a C-shaped permanent magnet and a generally cylindrical member of magnetic material mounted for rotation adjacent the magnet pole pieces in response to movement of a rotatable element. The permanent magnet and included pole pieces are fixedly mounted relative to the cylindrical member which is comprised of a half cylinder in the region of the air gap which contains the Hall Effect device and which therefor varies the size of the air gap and thus the flux density through the Hall Effect device as the cylindrical member rotates with movement of the rotatable element.

BRIEF DESCRIPTION OF THE DRAWINGS

The foregoing and other objects, features and advantages of the invention will be apparent from the following more particular description of preferred embodiments of the invention, as illustrated in the accompanying drawings, in which.

DETAILED DESCRIPTION

Figure 1:
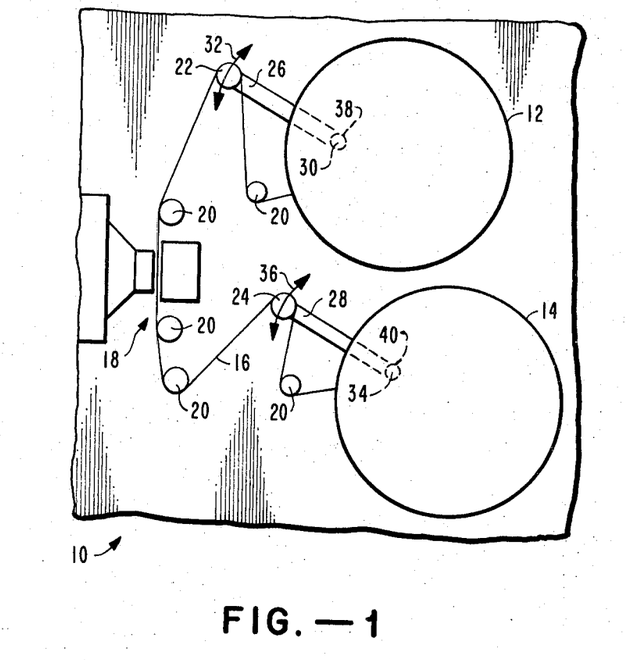
FIG. 1 is a plan view of a portion of a camera of the type in which rotational position sensors in accordance with the invention can be used to advantage.

FIG. 1 illustrates a portion of a camera of the type in which rotational position sensors in accordance with the invention may be used to advantage. The camera 10 of FIG. 1 is of the type used in microfilming in data processing operations and includes a pair of reels 12 and 14 for handling a length of photographic film 16 which extends therebetween and through an area including a film gate and lens 18. The film 16 is wound about a plurality of guide rollers 20 which help to define a path for the film 16 between the reels 12 and 14.

To prevent stretching or other distortion of the film 16 which may result in exposure of the film, and to improve the performance of the camera 10 in general, the film 16 is wound around a pair of guide rollers 22 and 24 respectively rotatably mounted at the ends of a pair of tension arms 26 and 28. The arm 26 is mounted for rotation about an axis 30 so as to move the guide roller 22 through an arc illustrated by an arrow 32. In similar fashion the arm 28 is mounted for rotation about an axis 34 so as to permit the guide roller 24 to move through an arc denoted by an arrow 36.

The reels 12 and 14 are individually driven by reels motors (not shown) which are controlled by a servo system responsive to the behavior of the film 16. Among other things such servo systems are responsive to film tension which is reflected by the rotational positions of the tension arms 26 and 28. Ideally the arms 26 and 28 are individually provided with rotational sensors of the type producing outputs which vary linearly with the angular or rotational positions of the arms 26 and 28. In the example of FIG. 1 the arms 26 and 28 are respectively provided with rotational position sensors 38 and 40 shown in dotted outline and described hereafter.

Figure 2:
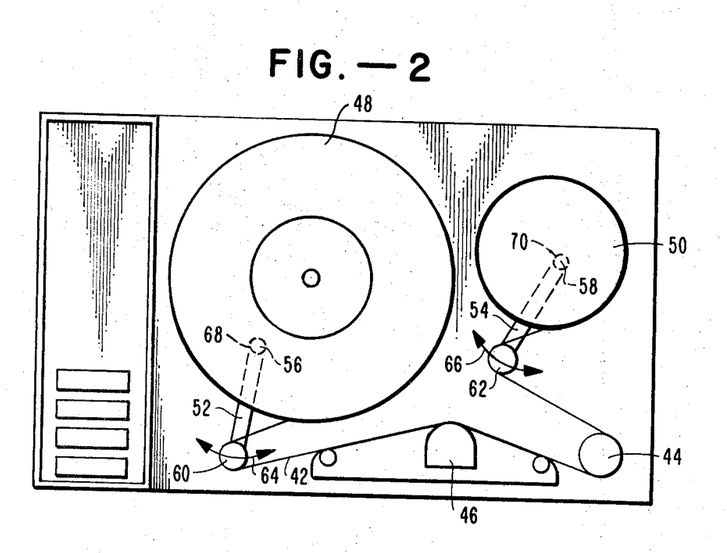
FIG. 2 is a plan view of magnetic tape deck of the type in which rotational position sensors in accordance with the invention can be used to advantage.

FIG. 2 illustrates a further example in which rotational position sensors in accordance with the invention are highly useful. The arrangement of FIG. 2 is similar to that of FIG. 1 except that it involves magnetic tape rather than film. In the FIG. 2 arrangement a length of magnetic tape 42 is driven by a capstan 44 past a processing region 46 which may include magnetic read and write heads between opposite reels 48 and 50. As in the case of the FIG. 1 arrangement the reels 48 and 50 are individually driven by reel drive motors (not shown) through a servo system responsive to the behavior of the magnetic tape 42. Tape tension is determined by a pair of arms 52 and 54 respectively rotatably mounted about axes 56 and 58 and having guide rollers 60 and 62 respectively rotatably mounted at the opposite ends thereof from the axes 56 and 58 for engagement with the magnetic tape 42. The tension arm 52 is rotatable about the axis 56 so as to move the guide roller 60 through an arc indicated by an arrow 64. Similarly the arm 54 is rotatable about the axis 58 so as to allow movement of the roller 62 through an arc denoted by an arrow 66. Signals which vary linearly with the rotational positions of the arms 52 and 54 are respectively provided by sensors 68 and 70. The sensors 68 and 70 which correspond to the sensors 38 and 40 of FIG. 1 are described hereafter.

Figures 3, 4:
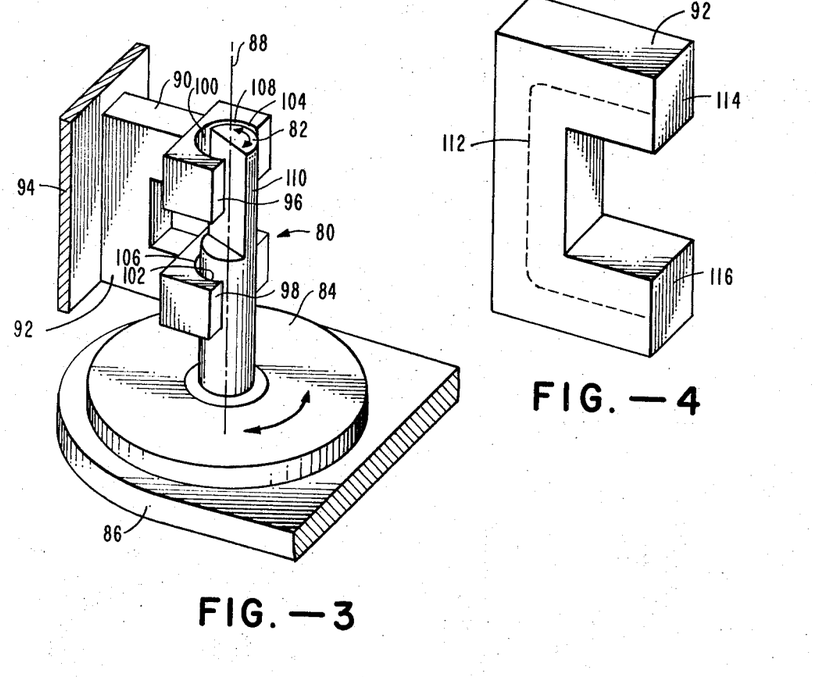
FIG. 3 is a perspective view of a rotational position sensor in accordance with the invention.
FIG. 4 is a perspective view of the permanent magnet in the sensor of FIG. 3.

FIG. 3 depicts a sensor 80 in accordance with the invention as including a generally cylindrical member 82 of magnetic material fixedly mounted via a disk-shaped base plate 84 to a rotatable element 86 whose rotational position is to be determined. The cylindrical member 82 is mounted so that the longitudinal axis thereof coincides with an axis of rotation 88 of the rotatable element 86. The sensor 80 includes a magnet assembly 90 comprising a generally C-shaped magnet 92 fixedly mounted to a support 94 and having a pair of pole pieces 96 and 98 mounted at the tips of the opposite legs of the magnet 92. The pole pieces 96 and 98 have generally semicircular recesses 100 and 102 respectively therein for surrounding portions of the cylindrical member 82 in spaced apart relation so as to define air gaps 104 and 106 between the pole pieces 96 and 98 respectively and the cylindrical member 82. Completing the sensor 80 is a Hall Effect device 108 mounted on the surface of the recess 100 within the air gap 104.

In operation the magnet 92 provides a fixed amount of flux through a magnetic path or circuit including the pole pieces 96 and 98, the air gaps 104 and 106, and the cylindrical member 82. As the cylindrical member 82 turns relative to the fixedly mounted pole pieces 96 and 98 the depths of the air gaps 104 and 106 remain the same since the axis of rotation 88 of the cylindrical member 82 coincides with the axis of the recesses 100 and 102 within the pole pieces. Moreover the area of the air gap 106 between the pole piece 98 and the cylindrical member 82 remains the same since the member 82 is cylindrical in the region of the recess 102 and thereby extends completely through the recess 102 for all possible angular or rotational positions of the member 82. However half of the upper portion of the cylindrical member 82 is removed so that only a portion 110 comprising a half cylinder remains in the vicinity of the pole piece 96. The portion 110 provides the cylindrical member 82 with a nonuniform cross section in the region of the recess 100 so as to vary the size of the air gap 104 with rotation of the member 82. Thus as cylindrical member 82 rotates in response to rotation of the element 86 the portion 110 rotates into or out of the recess 100 so as to respectively increase or decrease the area of the air gap 104. The magnet 92 produces a constant amount of magnetic flux in the magnetic circuit including the gap 104. Accordingly the variations in area of the gap 104 result in variations in the flux density within the gap 104 in the region of the Hall Effect device 108. Such variations are utilized by the Hall Effect device 108 to produce a signal which varies linearly with the rotational position of the element 86 as described in detail hereafter.

The variations in flux density produced within the air gap 104 in response to rotation of the cylindrical member 82 may be better understood by referring to one example of a sensor 80 constructed and successfully tested in accordance with the invention. The C-shaped permanent magnet 92 of such sensor is shown in somewhat greater detail in FIG. 4 to which reference is now made.

The mean length of the magnetic path $L_M$ of the magnet 92 as shown by the dotted line 112 is 1.73 cm in the present example. The area of the magnet 92 comprising the area of either of the opposite faces 114 and 116 is 0.1875 cm². If the cross-sectional area of the magnet 92 as represented by the faces 114 and 116 were round instead of square then the area $A_M$ thereof would be expressed as $A_M = \pi r^2$ where $r$ is the radius of the cross-sectional area. In such a case 0.1875 cm² = (3.1416) ($r^2$) and $r = \sqrt{0.1875/3.1416}$. The mean diameter D of such cross-sectional area would be $D = 2r = 2\sqrt{0.1875/3.1416} = 0.488$ cm. Accordingly the ratio of the mean length of the magnetic path $L_M$ to the mean diameter D is 1.73/0.488 or 3.54.

Figure 5:
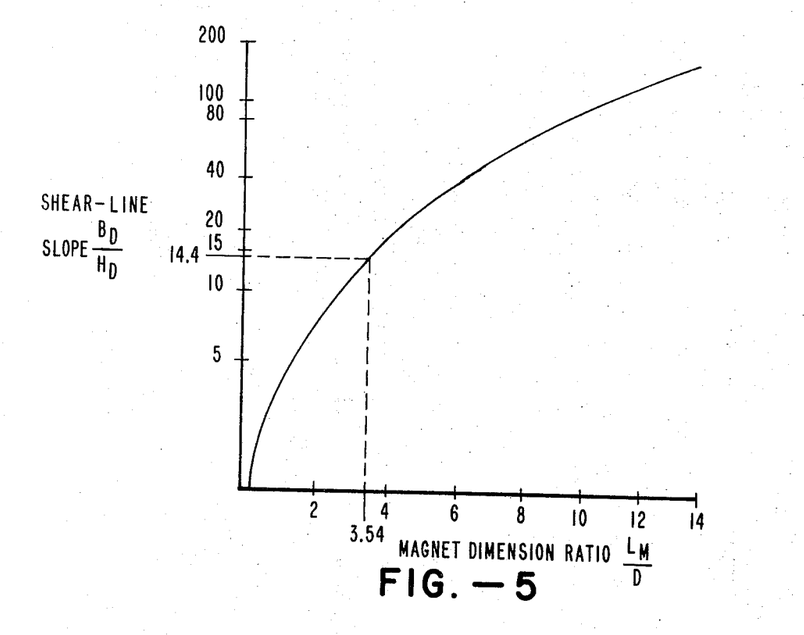
FIG. 5 is a diagrammatic plot of shear-line slope as a function of magnet dimension ratio for the magnet of FIG. 4.
Figure 6:
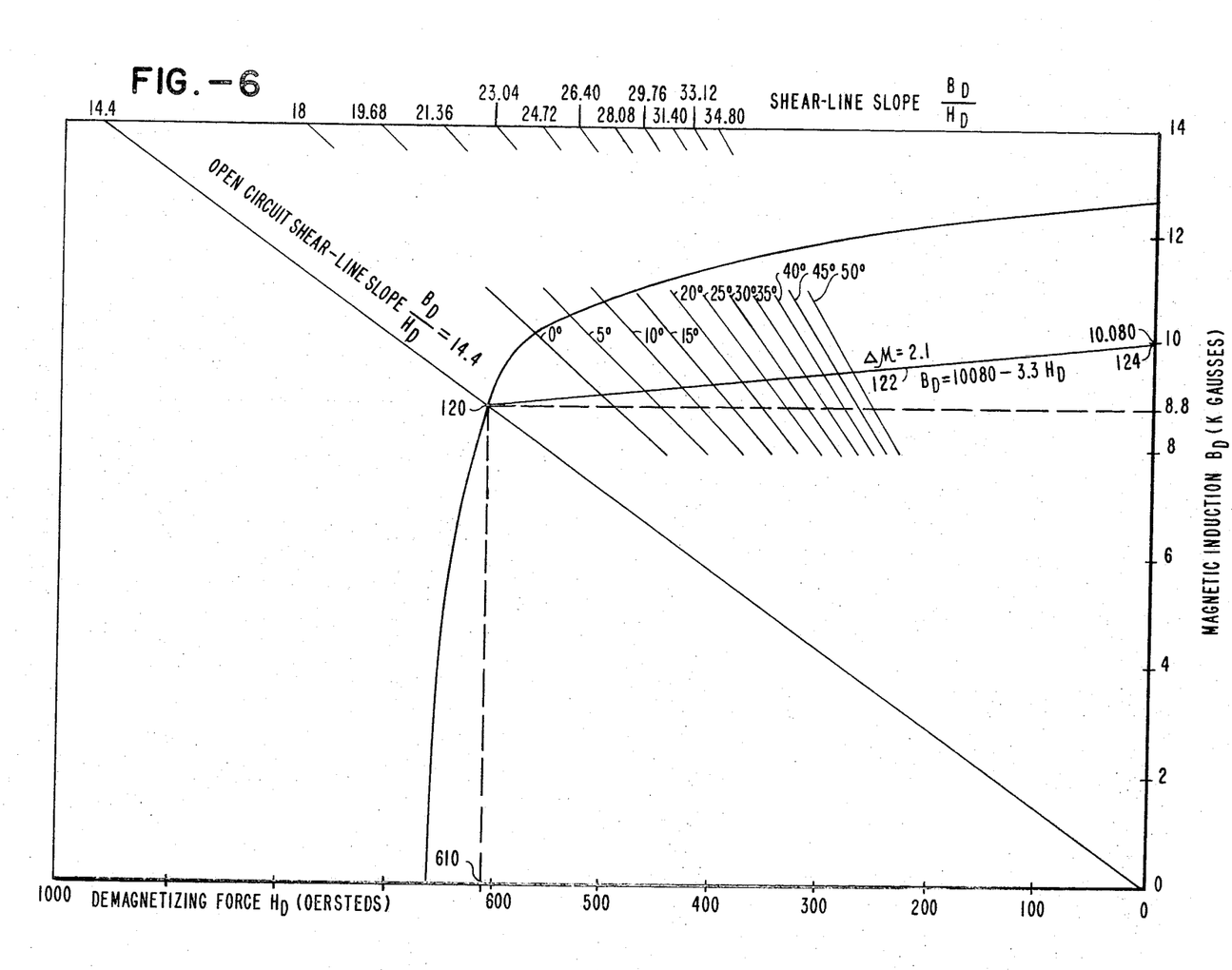
FIG. 6 is a demagnetization curve for the magnet of FIG. 4.

FIG. 5 is a curve representing the variation in shear-line slope $B_D/H_D$ with the dimension ratio $L_M/D$. $B_D$ is the magnetic induction and $H_D$ is the demagnetizing force. It will be seen from FIG. 5 that when the dimension ratio is 3.54 the corresponding shear-line slope is approximately 14.4. This shear-line slope of 14.4 can be located on a demagnetization curve for the particular Alnico magnet comprising the magnet 92 and which is shown in FIG. 6, to determine $H_D$ and $B_D$. Referring to FIG. 6 it is noted that the shear-line slope of 14.4 which pertains to the magnet 92 with nothing across the faces 114 and 116 or in an open circuited condition intersects the demagnetization or B–H curve at a point 120. At this particular operating point the demagnetizing force $H_D$ is approximately 610 oersteds and the magnetic induction $B_D$ is approximately 8,800 gausses.

The incremental permeability $\Delta\mu$ for the magnet 92 is known to be 2.1. Accordingly the maximum change $\Delta B_D$ which can occur in the magnetic induction is equal to $\Delta\mu H_D$ which in this case is 2.1 × 610 or 1,280 gausses. Thus the minor loop for the magnet 92 which is represented by the line 122 in FIG. 6 has a slope of 2.1 and intersects the vertical axis at a point 124 representing a value of 8,800 gausses + 1,280 gausses or 10,080 gausses.

The working point of the magnet 92 therefore lies on the line 122 at a location which is determined by the portion of the magnetic circuit external to the magnet 92. With nothing coupled across the faces 114 and 116 and the magnet 92 thereby open circuited the working point of the magnet 92 lies at the point 120 in FIG. 6, in which case the demagnetizing force $H_D$ is approximately 610 oersteds and the magnetic induction $B_D$ is approximately 8,800 gausses. At the opposite extreme a piece of magnetic material extending between and in contact with both the faces 114 and 116 short-circuits the magnet 92 so as to locate the working point at the point 124 where the demagnetizing force $H_D$ is 0 and the magnetic induction $B_D$ is 10,080 gausses.

The operating characteristic represented by the line 122 of FIG. 6 dictates a sensor of the type shown in FIG. 3 in which the flux density varies with rotation. The particular design of FIG. 3 provides further advantages in the form of a low number of mechanical parts, a magnet which can be produced from a single piece of material including the pole pieces 96 and 98 where desired, a variable air gap 104 of relatively small size and which is easily adjusted by moving the pole piece 96 toward or away from the cylindrical member 82, an air gap size which readily tolerates iron objects in the vicinity thereof without producing substantial changes in the total flux in the gap, and a sensor in which the Hall Effect device 108 is readily mounted by gluing or otherwise affixing to the surface of the recess 100 and where it is protected from damage.

If calculations are made in terms of centimeter-gram-seconds the permeability $\mu$ of air is approximately 1. In the example of FIG. 3 the air gap 104 is approximately 1 mm or 0.1 cm deep. Taking the diameter of the cylindrical member 82 into consideration the mean diameter of rotation in the gap 104 is 1.052 cm. That being the case the change in the length of the gap 104 for 5° of movement $L_5$ is $1.052\pi/360° \times 5°$ or 0.046 cm. The height of the air gap 104 in the present example is 0.396 cm, and accordingly the change in the area of the gap 104 for 5° of movement $A_5$ is 0.396 cm × 0.046 cm or 0.0182 cm².

The change in the shear-line slope produced by 5° of movement of the cylindrical member 82 can be expressed by the formula $\Delta(B_D/H_D) = (F/f)(A_5/A_M)(L_M/L_5)$ where F and $f$ are leakage and reluctance contants and $F/f$ can be considered as 1 for purposes of further discussion. It was previously noted that the mean length of the magnetic path $L_M$ for the magnet 92 is 1.73 cm and the area $A_M$ of the faces 114 and 116 is 0.1875 cm². Accordingly: $\Delta B_D/H_D = (0.0182/0.1875)(1.73/0.1) = 1.68$. It will therefore be seen that the magnetic characteristics of the device comprising the sensor 80 of FIG. 3 including among other things the change in the shear-line slope for a 5° change in movement can be readily determined by knowing the dimensions and the magnetic characteristics.

Figure 7:
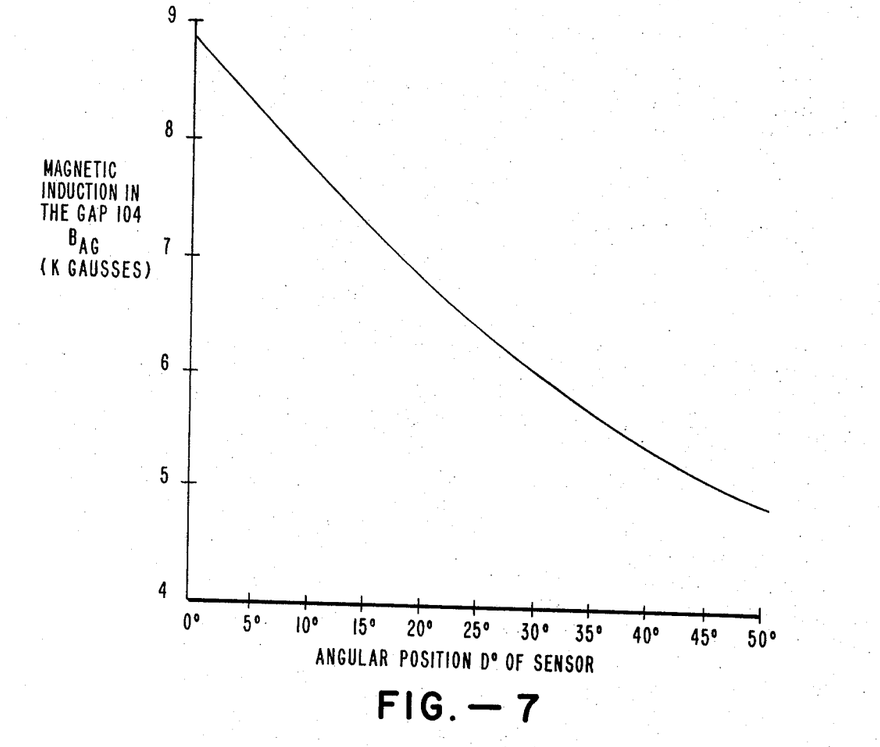
FIG. 7 is a diagrammatic plot of the magnetic induction in the variable air gap of the sensor of FIG. 3 as a function of angular position of the sensor.

The magnetic induction $B_{AG}$ in the air gap 104 is equal to $L_M\Delta H/L_G$ where $L_G$ is the depth of the gap 104. Accordingly $B_{AG} = 1.73$ cm/0.01 cm $\Delta H = 17.3$ $\Delta H$. In this fashion $B_{AG}$ can be plotted as a function of the angular position D° of the sensor 80 as seen in FIG. 7. FIG. 7 shows that the relationship between the magnetic induction $B_{AG}$ in the air gap 104 and the angular position D° of the sensor is nonlinear.

The shear-like slope is related to the variable gap circuit by the formula:

$B_D/H_D = (A_G/A_M)(L_M/L_G)$ where $L_G$ is the average depth of the air gap 104 and $A_G$ is the area of the air gap surface. Also $B_D/H_D = \Delta\mu$. From FIG. 6 the expression can be written $B_D = 10,080 = 3.3 H_D$. Therefore:

$$\frac{10080}{H_D} - 3.3 = \frac{A_G}{A_M}\frac{L_M}{L_G} \text{ and } H_D = \frac{10080}{\frac{A_G}{A_M}\frac{L_M}{L_G} + 3.3}$$

The magnetic induction in the gap 104 is:

$$B_{AG} = H_D \frac{L_M}{L_G} = \frac{10080}{\frac{A_G}{A_M}\frac{L_M}{L_G} + 3.3} \frac{L_M}{L_G}.$$

The mean diameter of rotation in the gap 104 was previously determined to be 1.052 cm. Accordingly the mean radius of the gap is half of this or 0.526 cm. The length of the air gap 104 in centimeters per degree is $2\pi \times 0.526/360 = 0.00918$ cm/degree. The change in the air gap area $A_{AG}$ as a function of rotation is 0.396 $\times 0.00918 \times D°$ or $3.64 \times 10^{-3} D°$. Thus:

$(A_G/A_M)(L_M/L_G) = (3.64 \times 10^{-3} D°/0.1875)$
$(1.73/0.01) = 0.336 D°$.

It was previously noted that:

$B_G = 10,080 \times 17.3/0.336 D° + 3.3 = 1.87 \times 10^5/0.336 D° + 3.3$. If the starting point for the magnet 92 is assumed to be at a shear-line slope of 20, then:

$B_G = 1.87 \times 10^5/0.336 D° + 23.3$.

This equation represents a hyperbolic curve with displaced zero.

Figure 8:
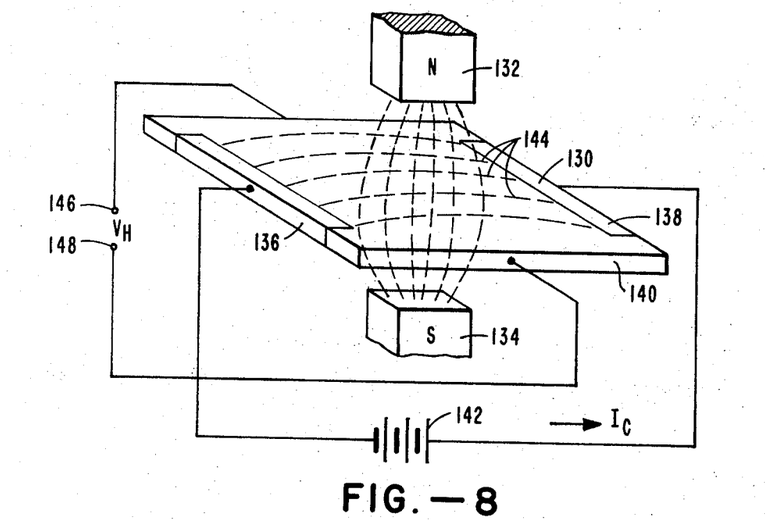
FIG. 8 is a perspective view of a Hall Effect device of the type which may be used in the sensor of FIG. 3.

A typical Hall Effect device such as may comprise the device 108 of the sensor 80 of FIG. 3 is illustrated in FIG. 8. The device of FIG. 8 includes a Hall element 130 disposed within a magnetic field. In the FIG. 8 arrangement the magnetic field is conveniently illustrated as being provided by opposite magnetic pole pieces 132 and 134. The Hall element 130 is a generally planar element of semiconductor material having opposite portions 136 and 138 of one conductivity type inset into a central portion 140 of opposite conductivity type.

With the opposite portions 136 and 138 of the Hall element 130 coupled to a power supply 142, a current $I_C$ flows through the element 130 and between the opposite portions 136 and 138 in the form of a plurality of charge carriers within the central portion 140 as shown by the dashed lines 144. The magnetic field provided by the pole pieces 132 and 134 passes through the central portion 140 of the Hall element 130 so as to deflect the charge carriers 144 and thereby produce a potential difference $V_H$ between a pair of electrodes 146 and 148 coupled to the opposite ends of the central portion 140 between the opposite portions 136 and 138. The voltage $V_H$ varies in direct proportion to the flux density through the Hall element 130, and accordingly Hall Effect devices of the type shown can be used to provide a direct representation of changes in a magnetic field.

In the case of the Hall Effect device 108 of the sensor 80 of FIG. 3 the magnetic circuit comprising the permanent magnet 92, the pole pieces 96 and 98 and the cylindrical member 82 which is of magnetic material provide the magnetic field through the semiconductor Hall element. As the rotatable element 86 rotates the cylindrical member 82 rotates so as to vary the size of the air gap 104 and thereby the flux density in the region of the Hall Effect device 108. Thus the changes in the electrical output of the Hall Effect device 108 are used in accordance with the invention to provide a representation of the angular or rotational position of the cylindrical member 82, the element 84 and thus the rotatable element 86.

The sensitivity of the particular Hall Effect device 108 used in the present example is expressed by $B = 800 V_H/I_C$ where B is the magnetic induction in gausses through the device, and $V_H$ and $I_C$ are respectively the voltage and current of the Hall Effect device in millivolts and milliamperes. It was previously noted that $B_{AG} = 1.87 \times 10^5/0.336 D° + 23.3$. Since $B_{AG}$ which is the magnetic induction in the air gap 104 corresponds to the magnetic induction B for the Hall Effect device 108, the expression may be written:

$1.87 \times 10^5/0.336 D° + 23.3 = 800 V_H/I_C$.

Therefore:

$V_H = I_C/1.44 \times 10^{-3} D° + 0.1$ and $I_C = V_H(1.44 \times 10^{-3} D° + 0.1)$. As was previously noted in connection with FIG. 7 the relationship between the magnetic induction $B_{AG}$ in the air gap 104 and the angular position of the sensor 80 is direct but nonlinear. As will be seen from the equation for $V_H$ noted above, if the current $I_C$ is kept constant the voltage $V_H$ will vary directly with respect to the angular position of the sensor 80. On the other hand if the voltage $V_H$ is kept constant at some value on the order of 40 millivolts, for example, then the equation for $I_C$ becomes: $I_C = 0.0576 D° + 4$. The resulting relationship is linear and comprises a straight line plot starting at $I_C = 4$ ma when $D° = 0$ as shown in FIG. 9.

Figure 9:
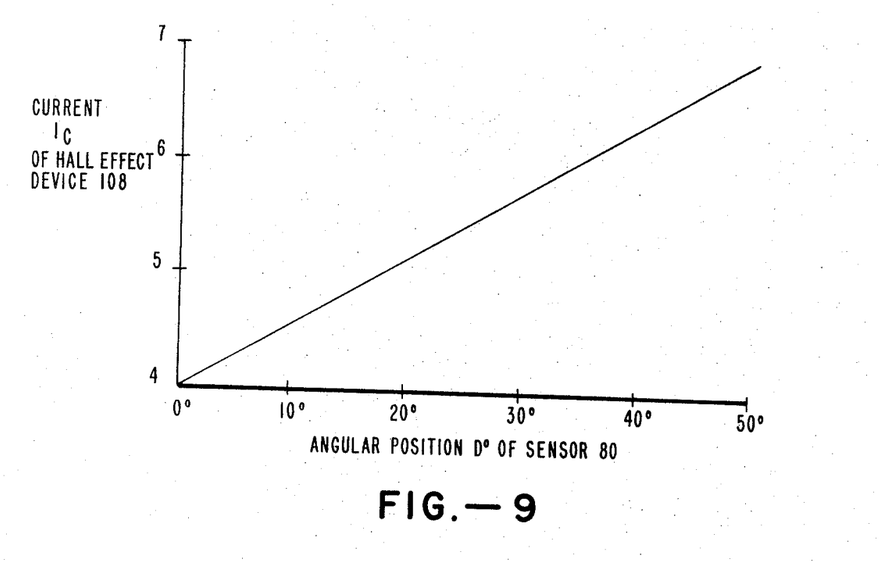
FIG. 9 is a diagrammatic plot of the current through the Hall Effect device of the sensor of FIG. 3 as a function of angular position of the sensor.

Accordingly FIG. 9 shows that if the voltage $V_H$ of the Hall Effect device 108 of the sensor 80 of FIG. 3 can be kept constant, then the current $I_C$ of the Hall Effect device 108 varies directly and linearly with the angular position of the sensor 80 and thus the rotatable element 86. In applications such as in the camera 10 of FIG. 1 where the arms 26 and 28 correspond to the rotatable element 86 of FIG. 3, the sensors 38 and 40 may comprise the sensor 80 of FIG. 3 in which event the Hall current $I_C$ of each sensor provides a highly accurate representation of the angular positions of the arms 26 and 28. Similarly the sensor 80 of FIG. 3 may be used as the sensors 68 and 70 of the tape transport of FIG. 2 such that the Hall currents $I_C$ provide direct and accurate representations of the angular positions of the arms 52 and 54.

Figure 10:
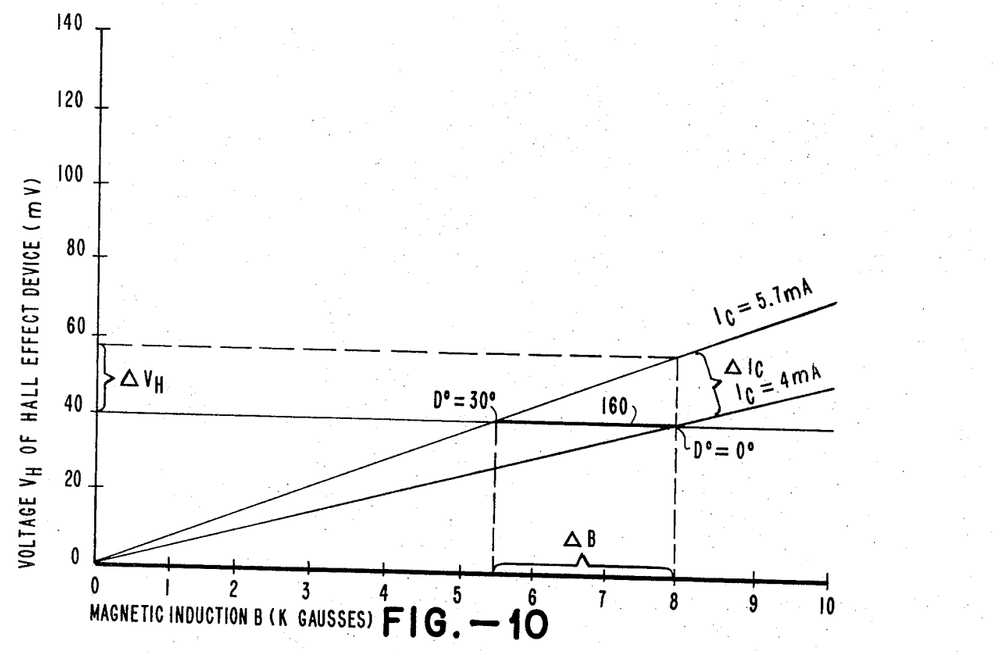
FIG. 10 is a diagrammatic plot of voltage and current of the Hall Effect device of the sensor of FIG. 3 as a function of magnetic induction in the variable air gap of the sensor.

Variations in the current $I_C$ and the voltage $V_H$ of a typical Hall Effect device such as the device 108 of FIG. 3 can be even better understood by referring to FIG. 10 which is a plot of the relationship of the voltage $V_H$ to the magnetic induction B through the Hall Effect device. Different values for the current $I_C$ appear as diagonal lines emanating from the origin. In the present example with the sensor 80 arbitrarily positioned at a point 30° removed from an arbitrary starting point such that $D° = 30°$, then an induction B of 5,420 gausses which results will produce a voltage $V_H$ of approximately 40 mv for a current $I_C$ of 5.7 ma. If the current $I_C$ is kept constant at 5.7 ma as the sensor 80 is rotated to the opposite extreme of $D° = 0°$, the resulting induction B of 7,900 gausses will produce a voltage $V_H$ of approximately 57.5 mv. Accordingly the sensor experiences a voltage change $\Delta V_H$ through a normal or 30° range of operation of 17.5 mv. However as previously noted the relationship between the voltage $V_H$ and the angular position D° of the sensor is nonlinear. In accordance with the invention a linear relationship is achieved by maintaining the voltage $V_H$ constant and varying the current $I_C$.

As seen in FIG. 10 the voltage $V_H$ is 40 mv when D° = 30°. At that point the current $I_C$ is 5.7 ma. If the voltage $V_H$ is kept constant at 40 mv as the sensor rotates, a generally horizontal working line 160 is defined. When $D° = 0°$ at the opposite end of the working line 160 the current $I_C$ has been reduced to 4 ma. Thus if the voltage $V_H$ of the Hall Effect device 108 of the sensor 80 of FIG. 3 is maintained constant as the sensor 80 rotates, the Hall Effect device current $I_C$ varies between 4 ma and 5.7 ma as seen in FIG. 10. The relationship between $I_C$ and the angular position D° of the sensor is linear as previously noted.

Figure 11:
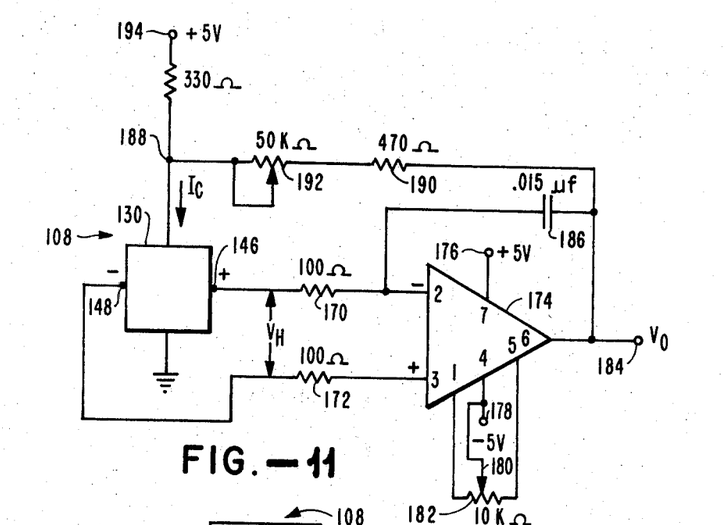
FIG. 11 is a schematic diagram of a preferred feedback circuit for use with Hall Effect devices in accordance with the invention.

The voltage $V_H$ of the Hall Effect device may be maintained constant during rotation of the sensor by use of a feedback circuit of the type shown in FIG. 11. In the arrangement of FIG. 11 the voltage terminals 146 and 148 of the element 130 of the Hall Effect device 108 are respectively coupled through resistors 170 and 172 to inverting and noninverting inputs of a differential amplifier 174. The amplifier 174 which comprises an operational amplifier sold under the designation μA704 by Fairchild Company in the present example has two of the terminals thereof respectively coupled to positive and negative power supply terminals 176 and 178. The terminal coupled to the power supply terminal 178 is also coupled to the wiper arm 180 of a potentiometer 182 having opposite ends coupled to two additional terminals of the amplifier 174. The output terminal of the amplifier 174 is coupled to an output terminal 184 to provide an output voltage $V_o$, to the inverting input of the amplifier 174 via a capacitor 186 and to a terminal 188 via a resistor 190 and a potentiometer 192. The terminal 188 is coupled between the current input of the Hall element 130 and a power supply terminal 194.

The amplifier 174 and the feedback loop including the resistor 190 and the potentiometer 192 function to make the Hall Effect voltage $V_H$ constant by varying the current $I_C$ and thereby the output voltage $V_o$. At $D_o = 0°$ the flux density through the Hall element 130 is at its highest value tending to make $V_H$ large and the noninverting amplifier input through the resistor 172 very negative. When such conditions exist the output voltage $V_o$ is set to equal 0 volts via the potentiometer 182. As the sensor 80 rotates from the 0° position, the flux density through the Hall element 130 decreases so as to tend to reduce $V_H$ by making the noninverting amplifier input through the resistor 172 less negative. This results in an output voltage $V_o$ which is other than 0 volts and a variable current which flows through the resistor 190 and the potentiometer 192 and combines with a constant current from the power supply terminal 194 to produce a total current $I_C$ sufficient to maintain $V_H$ relatively constant. As the flux density decreases with further rotation of the sensor the output voltage $V_o$ and the current $I_C$ continue to increase until maximum values are reached when $D° = 30°$, the flux density is at its lowest value and the noninverting amplifier input through the resistor 172 is least negative. As discussed in connection with FIG. 9 the current $I_C$ varies linearly with the angular position D° of the sensor 80. The output voltage $V_o$ varies in direct relation to the current $I_C$ and also has a linear relationship to the angular position as discussed hereafter in connection with FIG. 13. Accordingly the output voltage $V_o$ provides an exact indication of the rotational or angular position of the sensor 80 and thus the element 86 to which the sensor is attached.

Figure 12:
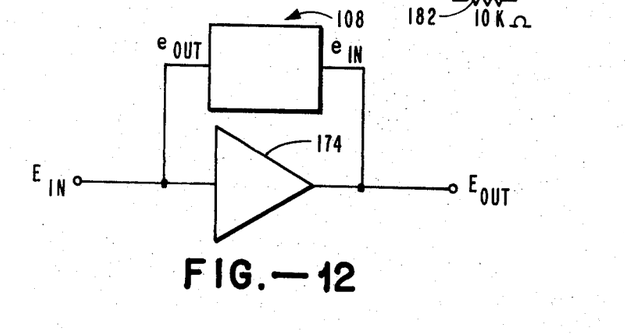
FIG. 12 is a simplified block diagram of the circuit of FIG. 11 useful in understanding the operation thereof; and, FIG. 13 is a diagrammatic plot of the output voltage produced by the circuit of FIG. 11 as a function of rotational position when the circuit of FIG. 11 is used in the sensor of FIG. 3.

The operation of the circuit of FIG. 11 may be better understood by referring to the simplified analogous circuit of FIG. 12 in which the input and output voltages of the amplifier 174 are represented as $E_{IN}$ and $E_{OUT}$ respectively while the input and output voltages at the Hall Effect device 108 are respectively represented as $e_{IN}$ and $e_{OUT}$. If K is the gain of the amplifier 174 then the overall transfer function is:

$$\frac{E_{OUT}}{E_{IN}} = \frac{e_{IN}}{e_{OUT}} \left( \frac{K \frac{e_{OUT}}{e_{IN}}}{1 + K \frac{e_{OUT}}{e_{IN}}} \right)$$

The minimum gain of the amplifier 174 used in the present example is at least 20. The gain of the Hall Effect device 108 may be calculated as follows:

$$e_{OUT}/e_{IN} = V_H/I_C (470 + 86) = B_G/(470 + 86) 800.$$

The input resistance of the Hall Effect device 108 in the present example is on the order of 86 ohms and the flux density lies between 1,000 and 2,000 gausses. Accordingly $$e_{OUT}/e_{IN} = 1,000/556 \times 800 = 2.25 \times 10^{-3}.$$

Therefore $$\frac{K \frac{e_{OUT}}{e_{IN}}}{1 + K \frac{e_{OUT}}{e_{IN}}} = \frac{2 \times 10^4 + 2.25 \times 10^{-3}}{1 + 2 \times 10^4 \times 2.25 \times 10^{-3}} = \frac{45}{46} = 0.98.$$

This shows that at a flux density of 1,000 gausses the overall error is a maximum of about ±2 percent. The output voltage $V_o$ depends on the Hall Effect device 108, and thus:

$$E_{OUT}/E_{IN} = e_{IN}/e_{OUT} = V_H/I_C (R_{IN} + R_{ADJ.})$$

where $R_{IN}$ is the value of the resistor 190 and $R_{ADJ.}$ is the resistance of the potentiometer 192. The voltage $V_H$ for the Hall Effect device 108 in the present example has a negative temperature coefficient of −0.1 percent per degree Centigrade. The input resistance $R_{IN}$ has a positive coefficient of the same magnitude, but $R_{IN}$ is only a small part of the total input resistance. Over a 45° temperature range the maximum temperature variation which may be expected is on the order of ±4.5 percent from $V_H$ and ±2 percent from the feedback circuit.

Figure 13:
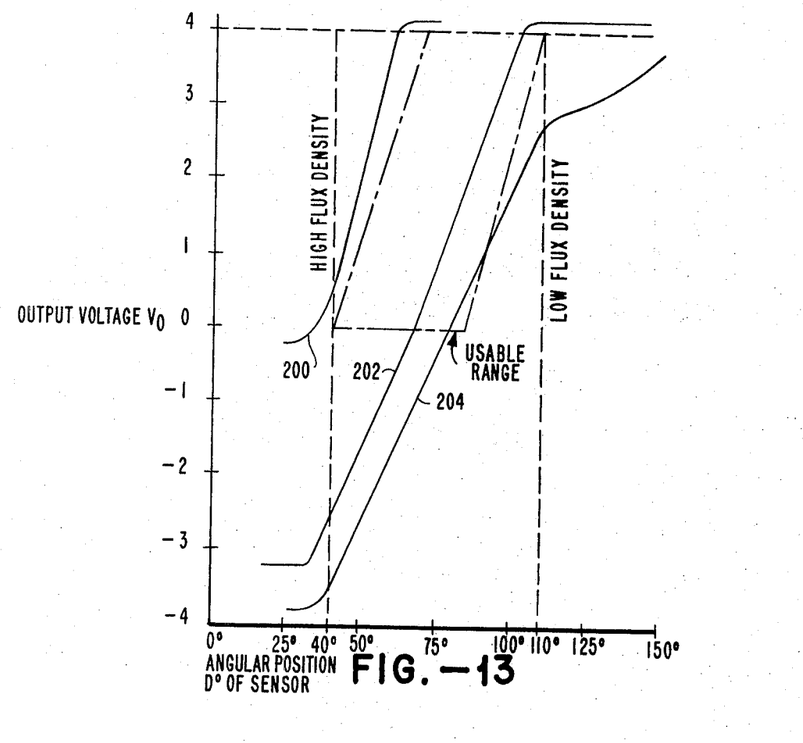

FIG. 13 is a plot of the output voltage $V_o$ from the circuit of FIG. 11 as a function of the angular position D° of the sensor 80. FIG. 13 depicts three different curves 200, 202 and 204 which represent three different settings of the potentiometer 192 in the circuit of FIG. 11. The curves of FIG. 13 were plotted by arbitrarily starting the sensor 80 at a position designated 0° and moving the sensor 150° therefrom. In this example the useful range of the sensor is between approximately 40° and 110° or a total of 70°. The useful range of the output voltage $V_0$ is ±4 V.

Both the potentiometer 192 and the potentiometer 182 of the circuit of FIG. 11 determine the curves of FIG. 13. These potentiometers are useful in calibrating each sensor 80 such as where the sensor is used in conjunction with one of the arms shown in the arrangements of FIGS. 1 and 2. In such situations the arm which comprises the rotatable element 86 is positioned at one extreme of its range of possible movement and the potentiometer 182 is adjusted to provide $V_0$ with a value of 0 V. The potentiometer 192 which effectively defines the position of the curve in FIG. 13 is then adjusted so that a maximum value of $V_0$ of 4 V is produced when the arm is at the opposite extreme.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A rotational position sensor for use with a rotatable element comprising:
    means responsive to the rotatable element for generating a magnetic field which varies with rotation of the rotatable element;
    a Hall Effect device disposed in the region of the magnetic field and operative to provide a varying voltage in response to changes in the magnetic field; and
    means for producing an electrical signal, said signal being applied to the Hall Effect device to maintain the voltage of the Hall Effect device substantially constant and providing a representation of the rotational position of the rotatable element.

2. The invention defined in claim 1, wherein the Hall Effect device has a constant current applied thereto, and the means for producing an electrical signal includes means for generating a variable current which combines with the constant current to maintain the voltage of the Hall Effect device substantially constant and means responsive to the variable current for generating a voltage representing the value of the variable current.

3. The invention defined in claim 1, wherein the means for producing an electrical signal includes means for changing a current through the Hall Effect device.

4. The invention defined in claim 3, wherein the means for producing an electrical signal includes means for generating an output voltage which varies with said current through the Hall Effect device.

5. The invention defined in claim 1, wherein the means for generating a magnetic field includes a magnetic circuit having a gap the size of which varies with the position of the rotatable element and means for producing a fixed amount of flux in the magnetic circuit.

6. The invention defined in claim 5, wherein the magnetic circuit includes a magnetic element mounted for rotation with the rotatable element and a pole piece spaced apart from the magnetic element to form said gap, and wherein the means for providing a fixed amount of flux comprises a magnet coupled to the pole piece.

7. The invention defined in claim 6, wherein the pole piece has a partial cylindrical recess therein for receiving the magnetic element, and the magnetic element comprises a cylindrical element having a portion thereof removed in the region of the recess of the pole piece.

8. A rotational position sensor comprising:
    rotatable means;
    means for providing a magnetic field having a strength which varies directly with angular position of the rotatable means;
    a Hall Effect device at least partly disposed within the magnetic field and having an output; and
    means coupled to the Hall Effect device and responsive to the output for generating a variable current, the variable current being applied to the Hall Effect device and bearing a linear relationship to the angular position of the rotatable means.

9. The invention defined in claim 8, wherein the rotatable means has a portion of nonuniform cross section and the means for providing a magnetic field includes magnet means mounted in spaced apart relation relative to the nonuniform cross section portion of the rotatable means to form therebetween a gap which varies in size with rotation of the rotatable means.

10. The invention defined in claim 9, wherein the magnet means includes a permanent magnet.

11. The invention defined in claim 8, wherein the variable current maintains a voltage of the Hall Effect device at a substantially constant value.

12. The invention defined in claim 8, further including a tension arm coupled to the rotatable means for rotation therewith about a common axis of rotation.

13. A rotational position sensor comprising:
    a rotatable element of magnetic material having a portion of nonuniform cross section;
    magnet means fixedly mounted adjacent the rotatable element so as to form at least one air gap therewith in the region of the portion of nonuniform cross section, said magnet means providing a fixed amount of flux through the rotatable element and the at least one air gap, and said air gap being variable in size in response to rotation of the rotatable element so as to provide varying flux density therein;
    a semiconductor element at least partly disposed within the at least one air gap and operative in response to the application of a constant current therethrough to produce a voltage which varies with the flux density in the at least one air gap;
    means responsive to the voltage produced by the semiconductor element for passing a variable current through the semiconductor element so as to keep the voltage substantially constant; and
    means responsive to the variable current for providing an output signal having a value bearing a direct relation to the variable current.

14. The invention defined in claim 13, wherein the means for passing a variable current through the semiconductor element and the means for providing an output signal together comprise a differential amplifier coupled to receive the voltage of the semiconductor element and to provide the output signal in the form of a voltage at an output thereof, and means responsive to the voltage at the output of the differential amplifier for providing a current having a value related to said voltage, the current being passed through the semiconductor element.

* * * * *